United States Patent
Wee et al.

(10) Patent No.: US 9,749,649 B2
(45) Date of Patent: Aug. 29, 2017

(54) METHOD AND SYSTEM FOR GENERATING AND DISPLAYING THUMBNAIL IMAGES FROM ORIGINAL IMAGES

(71) Applicants: Fingram Co., Ltd., Suwon (KR); QURAM Co., Ltd., Suwon (KR)

(72) Inventors: Young Cheul Wee, Suwon (KR); Seong Jin Yang, Gwangju (KR)

(73) Assignees: FINGRAM CO., LTD., Seoul (KR); QURAM Co., Ltd., Seoul (KR)

( * ) Notice: Subject to any disclaimer, the term of this patent is extended or adjusted under 35 U.S.C. 154(b) by 0 days.

(21) Appl. No.: 14/838,272

(22) Filed: Aug. 27, 2015

(65) Prior Publication Data
US 2016/0065981 A1  Mar. 3, 2016

(30) Foreign Application Priority Data
Aug. 27, 2014 (KR) .................. 10-2014-0112229

(51) Int. Cl.
G06K 9/36 (2006.01)
H04N 19/44 (2014.01)
H04N 19/172 (2014.01)
G06T 3/40 (2006.01)

(52) U.S. Cl.
CPC ............ *H04N 19/44* (2014.11); *G06T 3/40* (2013.01); *H04N 19/172* (2014.11)

(58) Field of Classification Search
CPC .......... H04N 1/00005; H04N 1/00458; H04N 1/00461; H04N 1/3871; H04N 21/8355; H04N 19/59; H04N 5/44543; H04N 5/45
See application file for complete search history.

(56) References Cited

U.S. PATENT DOCUMENTS 6,215,523 B1 * 4/2001 Anderson .......... H04N 1/00384
348/333.05
2003/0128882 A1 * 7/2003 Kim ...................... G06K 9/005
382/239

FOREIGN PATENT DOCUMENTS

JP  1020070028253     3/2007
JP  1020100137865 A   12/2010
JP  1020110058522 A   6/2011

* cited by examiner

*Primary Examiner* — Eueng-Nan Yeh
(74) *Attorney, Agent, or Firm* — Knobbe Martens Olson & Bear LLP (57) ABSTRACT

A method and system for image processing is disclosed. An image processing system disposed on a data processing system generates a first thumbnail corresponding to an original image in response to an image display request. The image processing system decodes a first thumbnail in order to display the first thumbnail. The image processing displays the decoded first thumbnail on the data processing system. Region information corresponding to the first thumbnail is generated in the operation of decoding the first thumbnail. The region information indicates locations of a plurality of regions forming the original image.

11 Claims, 9 Drawing Sheets

METHOD AND SYSTEM FOR GENERATING AND DISPLAYING THUMBNAIL IMAGES FROM ORIGINAL IMAGES

TECHNICAL FIELD

The present disclosure relates to a method and system for image processing. More particularly, the present disclosure relates to a method and system for image processing able to perform efficient region decoding and/or efficient thumbnail utilization.

DESCRIPTION OF RELATED ART

As image pickup means supporting high image qualities have become widespread, high-quality images are commonly used in data processing systems (e.g. mobile phones, tablets, personal computers (PCs), web servers, or the like).

In addition, due to high image quality, thumbnails and region decoding are now actively used.

Thumbnails are images reduced in size, and are generally used for image display instead of original images.

In the related art, thumbnails are generally used for image lists such that users can intuitively view what kind of images the original images is. Recently, a variety of methods have been used for thumbnails, such as a method of preparing a thumbnail of a high-quality image and displaying the thumbnail as is, or by scaling the thumbnail by a certain ratio for a period of time taken for decoding the high-quality image, until the original image is able to be displayed, in order to impart a user environment with real time feeling. In addition, various sizes of thumbnails, such as a small thumbnail, a medium thumbnail, and a large thumbnail, are used according to circumstances, such that thumbnails can be used in a variety of applications.

BRIEF SUMMARY

Region decoding is widely used, since only a portion of an image may need to be decoded. Such region decoding requires the following: The image must be able to be divided into certain regions (or areas); and a specific region or specific regions must be able to be selectively decoded from the original image based on the divided areas. Here, region information (or a region map) may be required, and the region decoding using region information is then widely used in the coding of various images or videos.

In particular, region decoding is commonly used when a user wants to zoom in to a specific area of an image. Specifically, when the user inputs a zoom request by selecting a specific area on a desired image, an image solution can perform zooming by selectively or preferentially decoding the specific area from the original image. Here, region information for discriminating the specific area of an image from the remaining areas of the image is required.

The region decoding is frequently performed in the case in which the thumbnail is displayed. For example, when an original image stored in the data processing system of the user is a high-quality image or a large-sized image, the image solution can display a suitable thumbnail (e.g. a large thumbnail) corresponding to the original image. When a zoom request is input in the case in which the thumbnail is displayed, the image solution may display a zoomed image by decoding a certain area of the original image, the zooming of which is requested. At this time, the region information of the original image is required in order to determine the certain area of the original image, the zooming of which is requested.

Figure 1:
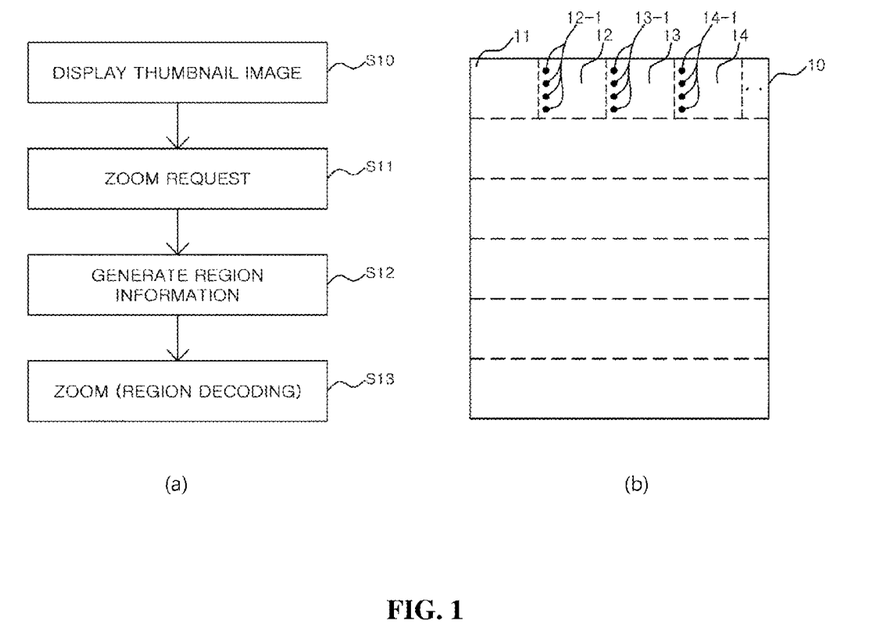
FIG. 1 is a flowchart illustrating region decoding.

FIG. 1 is a flowchart illustrating region decoding.

Referring to (a) of FIG. 1, in S10, an image solution displays an image by decoding the image or displays a thumbnail image corresponding to the image in response to a display request for the image. In 511, a user selects a specific area from the original image of the displayed image or from the thumbnail image and subsequently inputs a zoom request. In S13, the image solution performs zooming by executing region decoding in order to preferentially or selectively decode the specific area. Here, region information regarding the original image is required, as described above. Thus, when the zoom request is input, then the image solution generates the region information by performing reverse encoding (e.g. Huffman decoding) on the original image in S12, and then performing zooming in S13.

Referring to (b) of FIG. 1, region information may be information specifying each of a plurality of regions (e.g. 11, 12, 13, 14, and the like) having predetermined sizes, produced by dividing an image (e.g. an original image 10). For example, as illustrated in (b) of FIG. 1, the region information may be the positions of the leftmost pixels in each of the regions, but the region information may be embodied in a variety of forms.

As described above, when a process in which region decoding is requested after the original image or the thumbnail image is displayed, at that time the image solution generates the region information of the original image. The image solution can perform region decoding after the region information is generated. Thus, for example, when a user makes a zoom request, some image solutions may perform zooming after an interval (a period during which the region information is generated), thereby lowering the usability, which is problematic. That is, in the related art, after the original image or the thumbnail image is displayed, the process of generating region information for region decoding is performed only after a request for region decoding (e.g. a zoom request) is input.

In addition, when the thumbnail should be generated in real time for this playing the thumbnail or zooming (expansion/reduction) should be performed from the thumbnail image, regions of the original image corresponding to the thumbnail image are sequentially decoded and are sequentially uploaded to a graphic engine, or regions to be included in a zoomed image are sequentially uploaded to the graphic engine, from a predetermined region (e.g. the leftmost upper region), in order to display the zoomed image obtained by the zooming. Thus, in the case of a high-quality image, the user may visually recognize the regions sequentially changing from vagueness (e.g. a state in which another thumbnail is being displayed or an image before the zooming is being displayed) to clearness (e.g. a state in which the regions of the thumbnail to be displayed are being displayed by being decoded or the regions of the zoomed image are being displayed), which may be problematic.

Therefore, various aspects of the present disclosure provide a method and system for image processing able to previously generate the region information of an original image while decoding the original image in order to display the original image or generate a thumbnail image thereof when the original image or the thumbnail image is to be displayed, whereby immediate region decoding can be performed when the region decoding is required after the original image is displayed or the thumbnail image is displayed.

Also provided are a method and system for image processing, whereby, when the thumbnail image is uploaded to a graphic engine, a plurality of areas (regions or tiles) or all areas can be uploaded to the graphic engine at a time instead of being sequentially uploaded according to the areas included in the thumbnail image.

Also provided are a method and system for image processing able to sequentially display the areas of a zoom image according to sequence of preferential recognizing by a user when zooming is performed.

Also provided are a method and system for image processing able to generate a small thumbnail by an original ratio (i.e. the ratio of the original image), whereby the usability of the small thumbnail is improved when the small thumbnail has to be displayed.

According to an aspect, an image processing method includes: decoding, in an image processing system disposed on a data processing system, an original image in response to an image display request when the original image or a first thumbnail is determined to be displayed; displaying, in the image processing system, the decoded original image on the data processing system or the first thumbnail on the data processing system by generating the first thumbnail corresponding to the original image. The operation of decoding the original image includes generating region information corresponding to the original image while decoding the original image, the region information indicating each locations of a plurality of regions forming the original image.

According to an embodiment of the invention, an image processing system is disclosed. The image processing system includes: a thumbnail generating module configured to generate a first thumbnail corresponding to an original image based on the original image in response to an image display request; a decoding module decoding the generated first thumbnail; and a control module displaying the decoded first thumbnail on a data processing system on which the image processing system is disposed. The decoding module is configured to generate region information corresponding to the original image while generating the first thumbnail, the region information indicating locations of a plurality of regions forming the original image.

According to certain embodiment of the invention, the thumbnail generating module stores a second thumbnail corresponding to the original image. The first thumbnail is a large thumbnail, and the second thumbnail is a small thumbnail or a medium thumbnail. The control module can display the second thumbnail that is previously stored or displays the first thumbnail generated after the original image is decoded.

According to certain embodiment of the invention, the decoding module is configured to sequentially decodes a plurality of tiles to be included in the first thumbnail and stores decoded textures in a storage unit of the data processing system, and the control module is configured to load the textures stored in the storage unit to a graphic engine at a time.

The image processing system can include an interface module configured to receive a zoom request for a specific region of the first thumbnail that is displayed. In response to the zoom request, the control module performs zooming based on the previously-generated region information.

According to an embodiment of the invention, an image processing system includes: an interface module configured to receive a zoom request for a specific region of an image displayed on a data processing system; and a control module configured to preferentially decode and display a reference region located at a center of a zoom image to be displayed after zooming is performed in response to the zoom request, and configured to, subsequently, sequentially decode and display remaining regions of the zoom image in an order from closest to farthest regions from the reference region.

According to an embodiment of the invention, an image processing system includes: a thumbnail generating module configured to generate a thumbnail corresponding to an original image by an original ratio and storing the thumbnail in a data processing system; and a control module configured to display the thumbnail. The control module is configured to display the thumbnail by cropping the second thumbnail by a grid view ratio or to display the stored thumbnail by a screen ratio.

The image processing method may further include previously generating and storing, in the image processing system, a second thumbnail corresponding to the original image. The first thumbnail is a large thumbnail or a medium thumbnail, and the second thumbnail is a small thumbnail. The image processing system selectively displays the second thumbnail or the first thumbnail, wherein, when the second thumbnail is selected, the image processing system displays the second thumbnail that is previously stored, and when the first thumbnail is selected, the image processing system generates the first thumbnail by decoding the original image and displays the first thumbnail.

The image processing method may further include sequentially decoding, in the image processing system, a plurality of tiles to be included in the first thumbnail and storing decoded textures in a storage unit of the data processing system. The operation of displaying, in the image processing system, the decoded original image or the first thumbnail on the data processing system includes loading the textures stored in the storage unit to a graphic engine at a time.

The image processing method may further include displaying a previously-stored second thumbnail corresponding to the original image. When the first thumbnail is displayed after the second thumbnail, is displayed, the image processing system loads the textures of the plurality of tiles stored in the storage unit to the graphic engine at a time.

The image processing method may further include: receiving, in the image processing system, a zoom request for a specific region of the displayed first thumbnail; and performing zooming based on the previously-generated region information in response to the zoom request.

The operation of performing the zooming based on the previously-generated region information in response to the zoom request may include preferentially decoding and displaying a reference region of a zoom image to be displayed after the zooming in response to the zoom request; and sequentially decoding and displaying the zoom image in the order from closest to farthest regions from the reference region.

The reference region may be a region corresponding to the center of the specific region.

The image processing method may further include: generating the second thumbnail by an original ratio corresponding to the original image and storing the generated second thumbnail. The image processing system displays the second thumbnail by cropping the second thumbnail by a grid view ratio or displays the stored second thumbnail by the original ratio.

According to another aspect, an image processing method includes: displaying, in an image processing system, a second thumbnail corresponding to an original image; sequentially decoding, in the image processing system, a plurality of tiles to be included in a first thumbnail and storing the plurality of tiles in a storage unit of a data processing system in order to display the first thumbnail after displaying the second thumbnail; and loading textures of the plurality of tiles stored in the storage unit to a graphic engine at a time.

According to further another aspect, an image processing method includes receiving, in an image processing system, a zoom request for a specific region of an image displayed on a data processing system; preferentially decoding and displaying a reference region located at the center of a zoom image to be displayed after zooming in response to the zoom request; and sequentially decoding and displaying remaining regions of the zoom image in the order from closest to farthest regions from the reference region.

According to still another aspect, an image processing method includes: previously generating, in an image processing system, a thumbnail corresponding to an original image by an original image, and storing the thumbnail in a data processing system; and displaying, in the image processing system, the thumbnail by cropping the second thumbnail by a grid view ratio or the stored thumbnail by a screen ratio.

According to another aspect, the above-described methods may be realized by a computer program installed in the data processing system.

According to further another aspect, an image processing system includes a thumbnail generating module generating a first thumbnail corresponding to an original image based on the original image in response to an image display request; a decoding module decoding the generated first thumbnail; and a control module displaying the decoded first thumbnail on a data processing system on which the image processing system is disposed. The decoding module generates region information corresponding to the original image while generating the first thumbnail, the region information indicating locations of a plurality of regions forming the original image.

The thumbnail generating module may store a second thumbnail corresponding to the original image. The first thumbnail may be a large thumbnail, and the second thumbnail is a small thumbnail or a medium thumbnail. The control module may display the second thumbnail that is previously stored or displays the first thumbnail generated after the original image is decoded.

The decoding module may sequentially decode a plurality of tiles to be included in the first thumbnail and store decoded textures in a storage unit of the data processing system. The control module may load the textures stored in the storage unit to a graphic engine at a time.

The image processing system may further include an interface module receiving a zoom request for a specific region of the first thumbnail that is displayed. The control module performs zooming based on the previously-generated region information in response to the zoom request.

According to still another aspect, an image processing system includes: an interface module receiving a zoom request for a specific region of an image displayed on a data processing system; and a control module preferentially decoding and displaying a reference region located at a center of a zoom image to be displayed after zooming is performed in response to the zoom request, and subsequently, sequentially decoding and displaying remaining regions of the zoom image in an order from closest to farthest regions from the reference region.

According to yet another aspect, an image processing system includes: an image processing system includes: a thumbnail generating module previously generating a thumbnail corresponding to an original image by an original ratio and storing the thumbnail in a data processing system; and a control module displaying the thumbnail, wherein the control module displays the thumbnail by cropping the second thumbnail by a grid view ratio or displays the stored thumbnail by a screen ratio.

According to an exemplary embodiment, when displaying a thumbnail image by generating the thumbnail image in real time from the original image or when displaying the original image itself, it is possible to previously generate the region information of an original image while decoding the original image before a user request requiring region decoding is input. Accordingly, it is possible to immediately perform region decoding.

When the thumbnail image is uploaded to a graphic engine, a plurality of areas (regions or tiles) or all areas can be uploaded to the graphic engine at a time instead of being sequentially uploaded according to the areas included in the thumbnail image. It is possible to prevent visual effects in that the image sequentially becomes clear to the user, thereby improving the usability. In addition, the overall display time can be reduced.

In addition, the areas of a zoom image are sequentially displayed (i.e. sequentially decoded) such that an area to be preferentially recognized by a user during zooming is displayed first. Consequently, the zooming can be performed such that the user does not feel visual fatigue.

Furthermore, a small thumbnail is generated by an original ratio (i.e. the aspect ratio of the original image). When the small thumbnail must be displayed by the original ratio in some time and by a grid view ratio in other time, the small thumbnail can be efficiently displayed.

BRIEF DESCRIPTION OF THE DRAWINGS

A brief description is given for the enhancement of understanding of the accompanying drawings, in which.

DETAILED DESCRIPTION

The present disclosure has other advantages associated with the operation of the present disclosure and objects that may be realized by the practice of the present disclosure which will be apparent from, or are set forth in greater detail in the accompanying drawings, which are incorporated herein, and in the following Detailed Description, which together serve to explain certain principles of the present disclosure.

Herein, it will be understood that, when an element is referred to as "transmitting" data to another element, the element can not only directly transmit data to another element but also indirectly transmit data to another element via at least one intervening element.

In contrast, when an element is referred to as "directly transmitting" data to another element, the element can transmit the data to another element without an intervening element.

The present disclosure will now be described more fully hereinafter with reference to the accompanying drawings, in which exemplary embodiments thereof are shown. The same reference numerals and signs are used throughout the different drawings to designate the same components.

Figure 2:
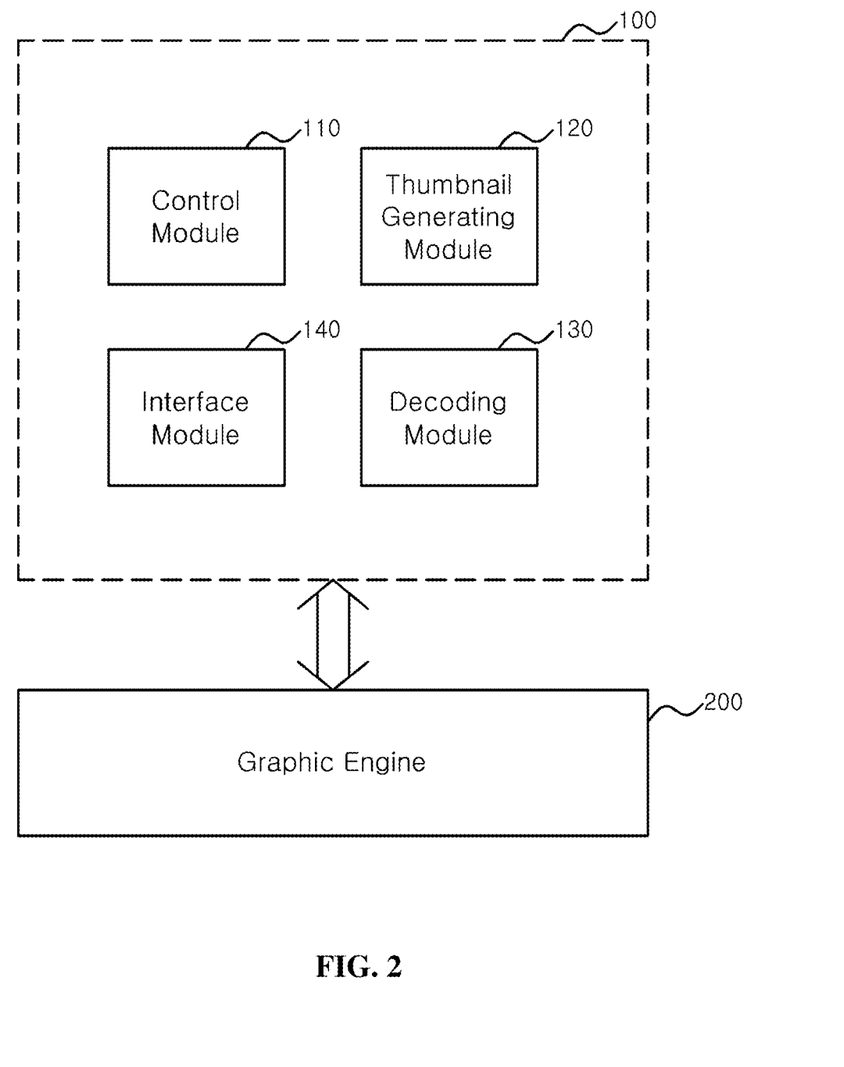
FIG. 2 is a schematic block diagram illustrating the configuration of an image processing system according to an exemplary embodiment.

FIG. 2 is a schematic block diagram illustrating the configuration of an image processing system according to an exemplary embodiment.

Referring to FIG. 2, the image processing system 100 according to the present embodiment includes a control module 110, a thumbnail generating module 120, and a decoding module 130. The image processing system 100 may further include an interface module 140.

In the specification, the term "module" may refer to a functional and/or structural combination of hardware for realizing the principle of the present disclosure and software for enabling the hardware to operate. For example, the module may indicate a logical unit of codes and hardware resources executing the codes. It will be apparent to a person skilled in the art to which the present disclosure pertains that the module does not necessarily indicate either physically-connected codes or only a single type of hardware.

In some implementations, the image processing system 100 may be distributed to a plurality of physical units instead of being a single physical unit. When components of the image processing system 100 are embodied as independent physical units as required, these independent physical units may be systematically combined by means of wired/wireless networks to realize the image processing system 100 according to the present embodiment.

The control module 110 controls the functions and/or resources of the other components of the image processing system 100 (e.g. the thumbnail generating module 120, the decoding module 130, and/or the interface module 140).

The image processing system 100 may be disposed on a data processing system to allow the operations and/or functions according to an exemplary embodiment to be realized. In this regard, the image processing system 100 may be a system embodied by systematically combining software (e.g. a computer program or an image solution) for realizing the operations and/or the functions of the image processing system 100 and hardware of the data processing system.

The data processing system may be embodied as various types of hardware, for example, a mobile phone, a tablet, a computer, a server, or the like, having data processing ability, to realize embodiments of the present disclosure. For example, the data processing system may be a system realized by systematically combining a plurality of physical units by means of wired/wireless networks.

The image processing system 100 can generate a thumbnail corresponding to the original image stored in the data processing system. The image processing system 100 may generate and store the thumbnail before the thumbnail is required to be displayed. Alternatively, the image processing system 100 may display the thumbnail by generating the thumbnail in real time from the original image at every instant when the thumbnail is required to be displayed. The image processing system 100 may be a system using at least two types of thumbnails. One type of thumbnail may be previously generated by the image processing system 100 when the original image thereof is obtained. The thumbnail to be previously generated may be a small thumbnail or a medium thumbnail. Another type of thumbnail may be generated in real time from the original image thereof by image processing system 100 at every time when the thumbnail is required to be displayed. This type of thumbnail may be a thumbnail having a large capacity (size) that would generally consume a large amount of resources when the thumbnail was previously generated. This type of thumbnail may be a large thumbnail or a medium thumbnail. The medium thumbnail may be previously generated and stored in some implementations or may be generated and used in real time like the large thumbnail in the other implementations. The generation of the thumbnail may be performed by the thumbnail generating module 120 of the image processing system 100. The thumbnail generating module 120 may generate the thumbnail by a variety of methods well known in the art, and thus detailed descriptions of such methods will be omitted herein.

In any case, in the specification, the thumbnail generated from the original image in real time, such that the image thereof is to be displayed may be a first thumbnail, and the thumbnail previously generated and stored by the image processing system 100 may be a second thumbnail. In some implementations, the first thumbnail may be previously generated and stored by the image processing system 100. The first thumbnail may have a size having display size of the data processing system. The capacity and/or size of the second thumbnail may be smaller than the capacity and/or size of the first thumbnail.

In addition, in the specification, displaying the thumbnail may be defined as not only displaying the thumbnail as is, not also displaying the thumbnail by scaling the thumbnail as required.

As is well known in the art, the image processing system 100 may adaptively display a thumbnail selected from among a small thumbnail, a medium thumbnail, and a large thumbnail corresponding to a specific original image according to the time interval of an input request from a user or the type of the input request. For example, when a rapid response (a rapid display process) is required, a previously-stored second thumbnail may be displayed as is or by being scaled by a predetermined ratio. Otherwise, a first thumbnail may be generated and displayed. In some cases, the original image itself may be displayed by being decoded. In some implementations, the second thumbnail may be primarily displayed in order to improve the immediacy of the response and then the first thumbnail can be displayed.

Figure 4:
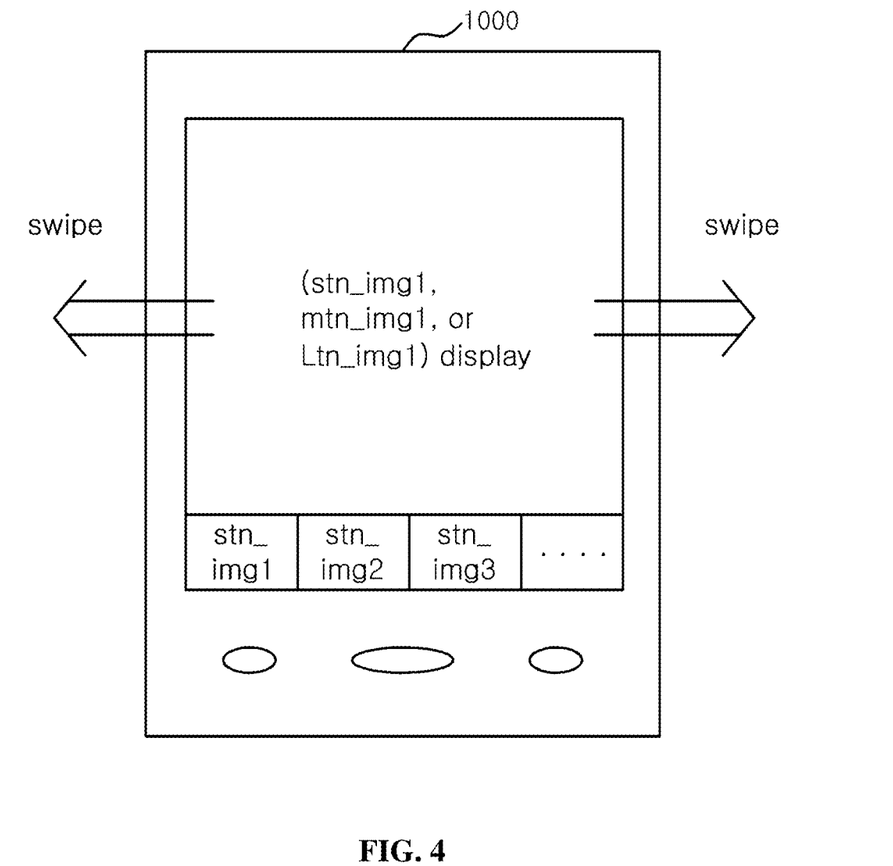
FIG. 4 is a schematic diagram illustrating an environment in which a thumbnail image is displayed according to an exemplary embodiment.

For example, as illustrated in FIG. 4, the image processing system 100 may display an image on the data processing system. The displayed image may be a small thumbnail stn_img1, a medium thumbnail mtn_img1, or a large thumbnail ltn_img1 corresponding to an original image, for example, an original image img1. The displayed image may be the original image itself. When the user wants to sequentially watch a plurality of images, for example, img1, img2, img3, and the like, while performing swiping at a rapid rate, the image processing system 100 can list up small thumbnails, for example, stn_img1, stn_img2, stn_img3, and the like, of a plurality of images, for example, img1, img2, img3, and the like, as illustrated in FIG. 4, and in this state, can display some images that are sequentially selected on a display area. At this time, the image processing system 100 may selectively display thumbnails corresponding to original images instead of displaying the original images that are sequentially selected. For example, after a second thumbnail (e.g. a small thumbnail or a medium thumbnail) is primarily displayed as it or by being scaled in order to respond to a selection or a request (e.g. swiping) having a rapid rate, when a detailed image or a clear image regarding a specific image must be displayed (e.g. when the swiping is stopped), a first thumbnail (e.g. a large thumbnail) of the specific image may be displayed. The control module 110 of the image processing system 100 can control the other components of the image processing system 100 such that the image processing system 100 can determine whether to adaptively display an original image itself or to display the thumbnail thereof, which thumbnail will be displayed, or how to display the selected thumbnail and can perform suitable image processing (e.g. scaling, zooming, or region decoding).

After the first thumbnail is displayed (or the original image is displayed), the user generally performs a request (e.g. a zoom request) for region decoding (e.g. zooming). In this case, as described above with reference to FIG. 1, in the related art, the region information of the original image must be generated in order to process the request after the first thumbnail is displayed (or the original image is displayed). In order to generate the region information, the original image must be subjected to a decoding process. More particularly, the encoded original image must be subjected to an reverse encoding process (e.g. Huffman decoding). After the region information is generated by the reverse encoding process, the request can be performed.

In order to overcome this problem, the decoding module 130 of the image processing system 100 can previously generate the region information of the original image in the process of decoding the original image in order to display the first thumbnail or the original image. Specifically, the decoding module 130 can generate the region information in the process of the decoding the original image to display the original image or generate the first thumbnail instead of generating the region information in response to a request (e.g. a zoom request) after the original image or the first thumbnail is displayed.

In this case, in the related art, the first thumbnail or the original image is displayed after the reverse encoding process. When the request is input, the reverse encoding process of the original image must be performed again in order to generate the region information. In contrast, according to the present embodiment, the reverse encoding process may not be repeatedly performed since the region information is previously generated during the reverse encoding process for displaying the first thumbnail or the original image. Thus, there is an effect in that prompt region decoding can be performed although a period of time, during which the original image or the first thumbnail is displayed, may slightly increase.

In some implementations, the image processing system 100 may determine to display the first thumbnail that is previously generated. In this case, since the first thumbnail is previously generated, the region information may be previously generated based on an action of the user (e.g. in which the user stops swiping a plurality of pictures, or the user stops moving the displayed first thumbnail), i.e. before a request to perform region decoding is input, instead of being generated during the decoding of the original image performed in the process of generating the first thumbnail.

For example, the image processing system 100 may stop swiping in a specific image while continuously swiping a plurality of images. The image processing system 100 may display the first thumbnail that is previously generated and stored. In this case, the image processing system 100 can generate the region information of the original image corresponding to the first thumbnail before a request to perform region decoding (e.g. a zoom request) is input through the first thumbnail. Although the possibility of the request for region decoding (e.g. the zoom request) to be input during the swiping operation is low, the possibility of the request for region decoding (e.g. the zoom request) to be input may rise when the swiping operation is stopped. Thus, when the swiping operation is stopped, the image processing system 100 may generate the region information of the original image corresponding to the first thumbnail.

For example, after the previously-generated first thumbnail is displayed, the image processing system 100 may perform the operation of moving the image in response to an input by the user. While the image is being moved, the possibility of the request for region decoding (e.g. the zoom request) to be input is low. When the operation of moving the image is stopped, the image processing system 100 may previously generate the region information of the original image corresponding to the image that is being displayed.

In addition, in the state in which the second thumbnail is displayed, substantially no request to perform region decoding is input. When the first thumbnail is intended to be displayed, the control module 110 of the image processing system 100 can control the decoding module 130 to generate the region information corresponding to the original image in the decoding process for displaying the first thumbnail. When the second thumbnail is intended to be displayed, the control module 110 can directly display the second thumbnail that was previously generated and stored by decoding the second thumbnail. This process will be described with reference to FIG. 3 as follows.

Figure 3:
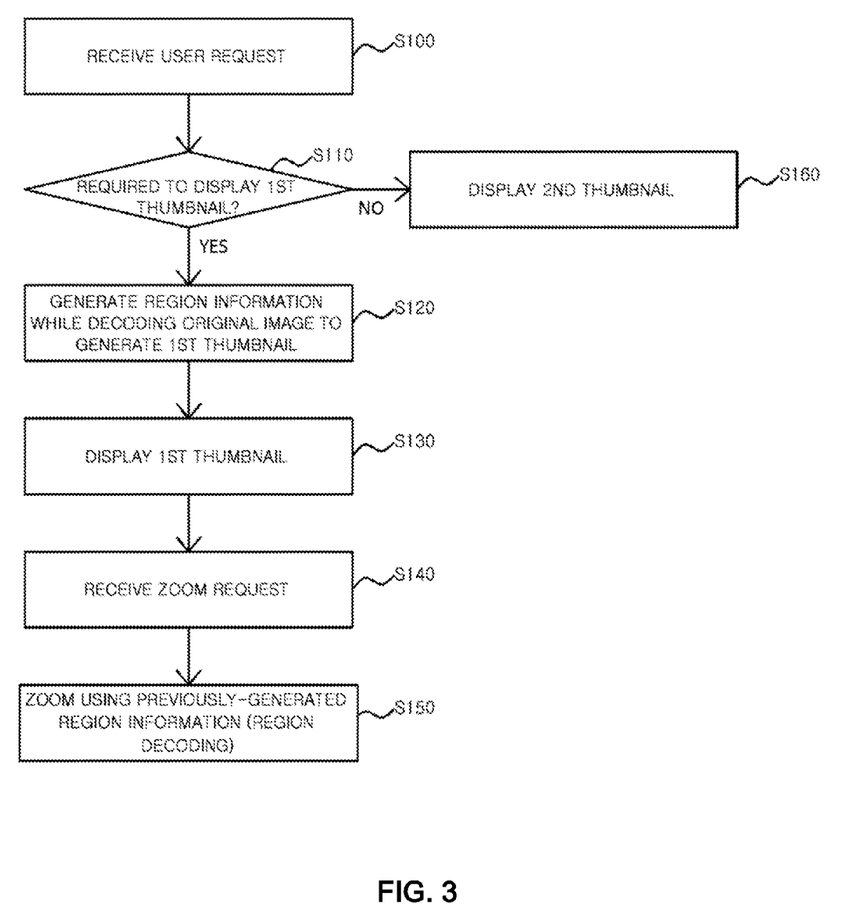
FIG. 3 is a flowchart schematically illustrating an image processing method according to an exemplary embodiment.

FIG. 3 is a flowchart schematically illustrating an image processing method according to an exemplary embodiment.

Referring to FIG. 3 together with FIG. 2, in S100, the image processing system 100 receives a user request via the data processing system. The user request may include a variety of examples, such as a display request for a specific image, a request for selecting another image, or the like. The user request may be received by the interface module 140 of the image processing system 100.

At S110, in response to the user request, the control module 110 of the image processing system 100 determines whether to display the original image corresponding to the image to be displayed or to display the thumbnail thereof and/or which thumbnail will be displayed. In 5160, when the second thumbnail is determined to be displayed (for example, when a rapid response is required), the control module 110 displays the second thumbnail. For this, the control module 110 decodes the second thumbnail previously stored in the data processing system and uploads a decoded texture to a graphic engine 200 (e.g. an OpenGL engine). Then, the graphic engine can display an image corresponding to the uploaded texture on a display device of the data processing system.

When the control module 110 determines to display the first thumbnail (e.g. when the first thumbnail, a clearer image, must be displayed since the user performs no action in the state in which the second thumbnail is displayed) or determines to display the original image in S110, the control module 110 controls the thumbnail generating module 120 to generate the first thumbnail (e.g. a large thumbnail) based on the original image. In S120, the decoding module 130 must decode the original image in order to generate the first thumbnail. In this process, the control module 110 controls the decoding module 130 to generate region information corresponding to the original image. After the first thumbnail is generated, in S130, the control module 110 displays the first thumbnail (e.g. the large thumbnail) by uploading the decoded texture of the first thumbnail (e.g. the large thumbnail) to the graphic engine.

When the control module 110 determines to display the original image, the control module 110 is required to decode the original image, and can generate the region information during decoding the original image.

Thus, the control module 110 can generate the region information of the original image by previously decoding the original image before a request in which the region information needs to be generated (e.g. a zoom request) is input by a user, regardless of whether the original image or the first thumbnail is to be displayed.

After the original image or the first thumbnail (e.g. the large thumbnail) is displayed, when the zoom request is received from the user in S140, zooming, i.e. region decoding, can be immediately performed using the region information that is already generated in S150. When the request for the region decoding is not input, the region information may not be used. However, since the region information is generated during the decoding process of displaying the original image or the first thumbnail (e.g. the large thumbnail), the region decoding (e.g. zooming) can be performed more rapidly and immediately when the region decoding must be performed using an additional (simple) process.

In the process in which the control module 110 displays the first thumbnail in S130, tiles included in the first thumbnail are sequentially displayed in the related art. The tiles may be identical to the regions or a plurality of regions may form a single tile according to implementations. In any case, in the related art, the tiles are sequentially decoded and uploaded to the graphic engine 200, such that the tiles of the first thumbnail are sequentially clearly displayed. However, in this case, repeated uploading to the graphic engine 200 causes redundancy. In addition, the user may visually recognize each of the tiles of the image changing vagueness to clearness, feeling that the decoding rate is slow. This disadvantageously lowers the usability.

An exemplary embodiment of the present disclosure intended to overcome this problem will be described with reference to FIG. 5A, FIG. 5B, and FIG. 5C.

Figure 5A:
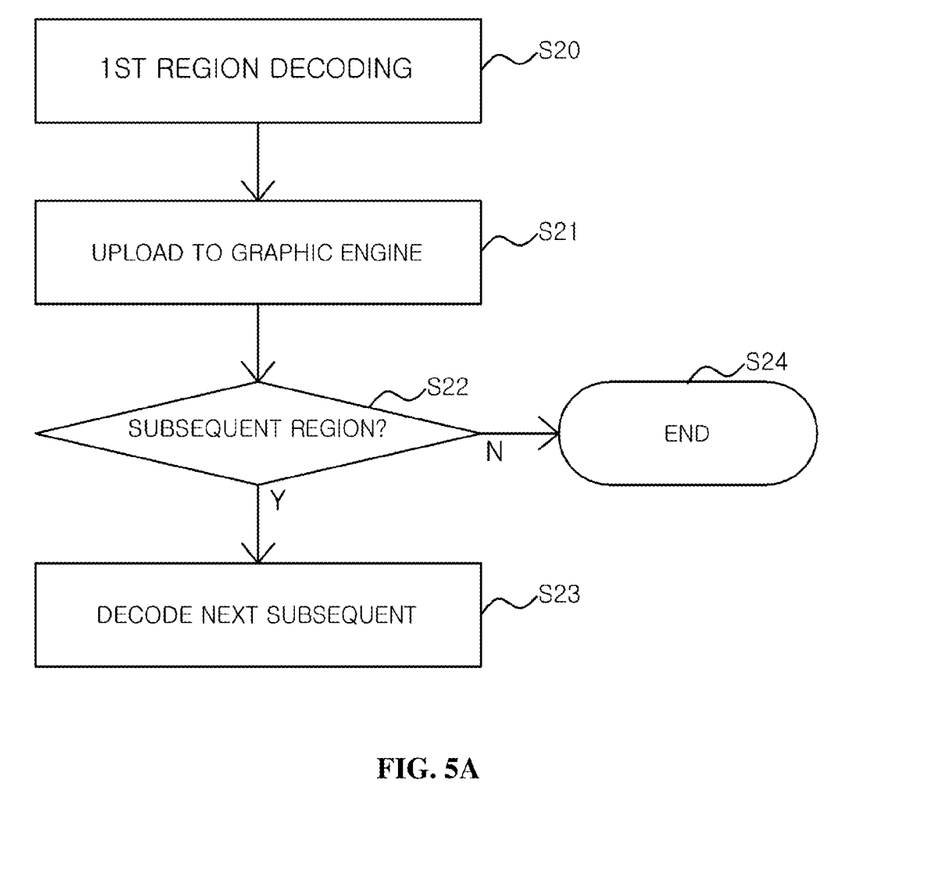
FIG. 5A to FIG. 5C illustrate a method of uploading an image to a graphic engine in an image processing method according to an exemplary embodiment.
Figure 5B:
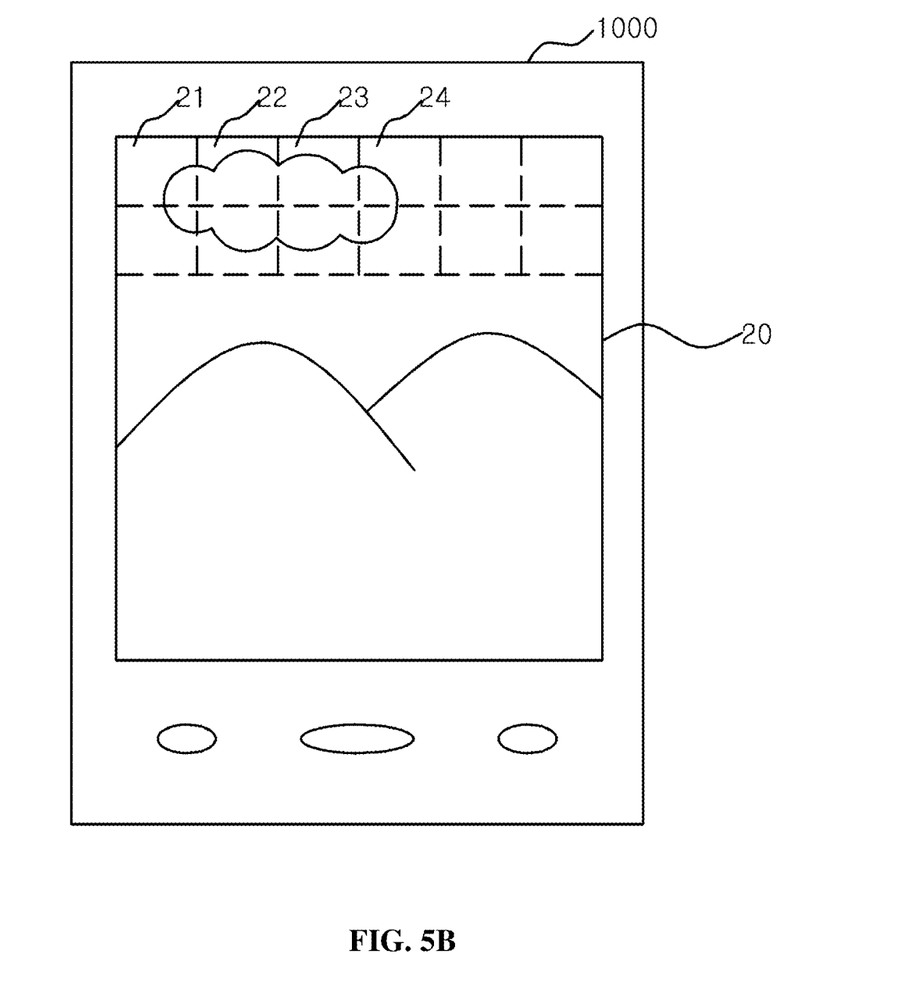
Figure 5C:
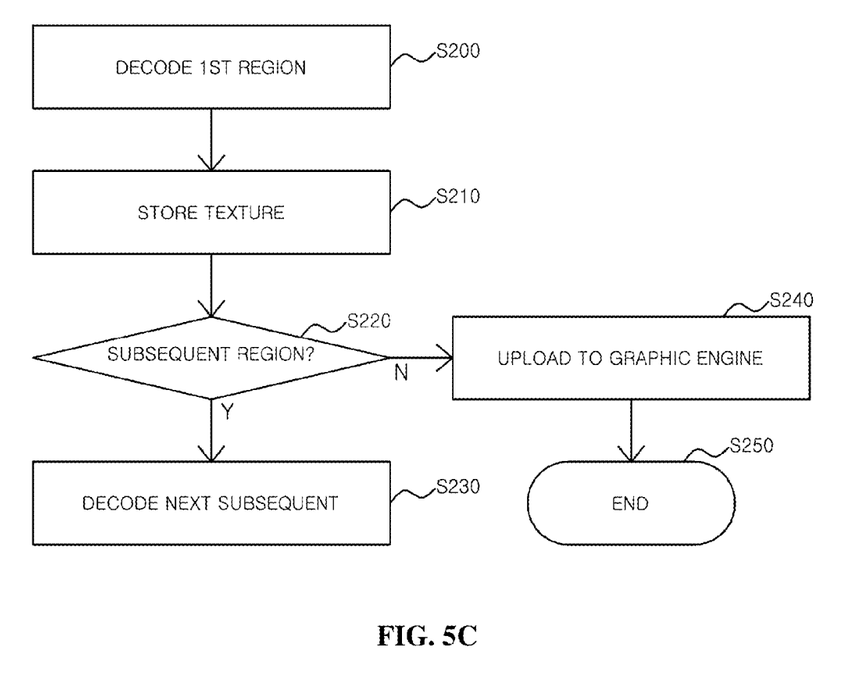

FIG. 5A to FIG. 5C illustrate a method of uploading an image to a graphic engine in an image processing method according to the present embodiment.

FIG. 5A schematically illustrates a process of displaying a first thumbnail in the related art, and FIG. 5B illustrates a change in an image displayed on a data processing system 1000 by a process illustrated in FIG. 5C.

As illustrated in FIG. 5B, a second thumbnail 20 is being displayed as is or by being scaled on the data processing system 1000. In this case, a vague image may be being displayed.

In S20, the image processing system decodes a first region, for example, 21 of the first thumbnail in order to display the first thumbnail. Although FIG. 5A to FIG. 5C illustrate an example in which the tile, the unit by which the image processing signal uploads an image or a thumbnail to the graphic engine 200, is identical to the region as described above, a plurality of regions may form a single tile.

In S21, the image processing system uploads a texture of the first region 21 obtained by the decoding to the graphic engine. Then, the first region 21, which was being displayed based on the second thumbnail, is now displayed based on the first thumbnail, whereby a clearer image (e.g. a higher-resolution image) can be displayed.

In S22, S23, and S24, the image processing system performs the operation of sequentially decoding subsequent regions 22, 23, and 24 and sequentially uploading the decoded regions to the graphic engine until no more region is remain. Then, the regions 22, 23, and 24 of the image 20 being displayed by the data processing system 100 can be sequentially replaced with a clearer image. Specifically, the image corresponding to the regions 21, 22, 23, and 24 obtained from the second thumbnail is sequentially replaced with the image obtained from the first thumbnail including more information than the second thumbnail. In this case, the user may visually recognize an image displayed by the data processing system 1000 sequentially changing to a clearer image, which is problematic.

Accordingly, in order to overcome the above-described problem, the image processing system 100 according to the present embodiment uploads a plurality of tiles (for example, all tiles of the first thumbnail) to the graphic engine 200 at a time instead of sequentially uploading the tiles to the graphic engine 200 as in FIG. 5C. This can also reduce the process of repeatedly uploading the tiles to the graphic engine 200.

Referring to FIG. 5C, in S200, the control module 110 controls the decoding module 130 to decode a first tile (e.g. the region 21) of the first thumbnail. In S210, the resultant texture obtained thereby is stored in a storage unit (e.g. a memory device provided in the data processing system 1000). In S220 and S230, the operations of decoding the subsequent tiles and storing the textures are repeatedly performed until no more tiles (regions) are left. When the textures of all tiles are generated and stored, the control module 110 uploads the tiles to the graphic engine 200 at a time in S240. Then, for example, when the second thumbnail is being displayed as in FIG. 5B, the plurality (or all) of tiles 21, 22, 23, and 24 are replaced with a clearer image. In this case, although the period of time taken for one tile (e.g. 21) to become clear may be increased, the period of time taken for all tiles to become clear may be reduced. Thus, the user does not have discomfort in that the image sequentially becomes clear.

After the first thumbnail is displayed, the user can input a request in which region coding (e.g. zooming) is required. In this case, as described above, the image processing system 100 can immediately perform zooming using the region information generated during the process of decoding the original image for displaying the first thumbnail, instead of generating the region information after the request is input.

Here, the zooming requires the process of displaying a zoom image (i.e. an image on which the zooming is performed) by decoding the zoom image from the original image. This also requires the process of displaying the regions of the zoom image by decoding the regions from the original image. In this case, in the related art, the tiles of the expanded image, i.e. the zoom image, are displayed by sequentially decoding the tiles from a predetermined region or tile (e.g. leftmost upper tile). The predetermined region is previously determined regardless of the characteristic of the zoom. Thus, in this case, the tiles of the zoom image are cleared in the predetermined order as described above with reference to FIG. 5A to FIG. 5C such that the entire zoom image becomes clear (i.e. the tiles of the zoom image are displayed by being decoded from the original image). In contrast, according to an exemplary embodiment of the present disclosure, it is possible to increase the decoding rate that the user feels by controlling the order of decoding and displaying the tiles of the zoom image when performing the zooming. This exemplary embodiment will be described with reference to FIG. 6.

Figure 6:
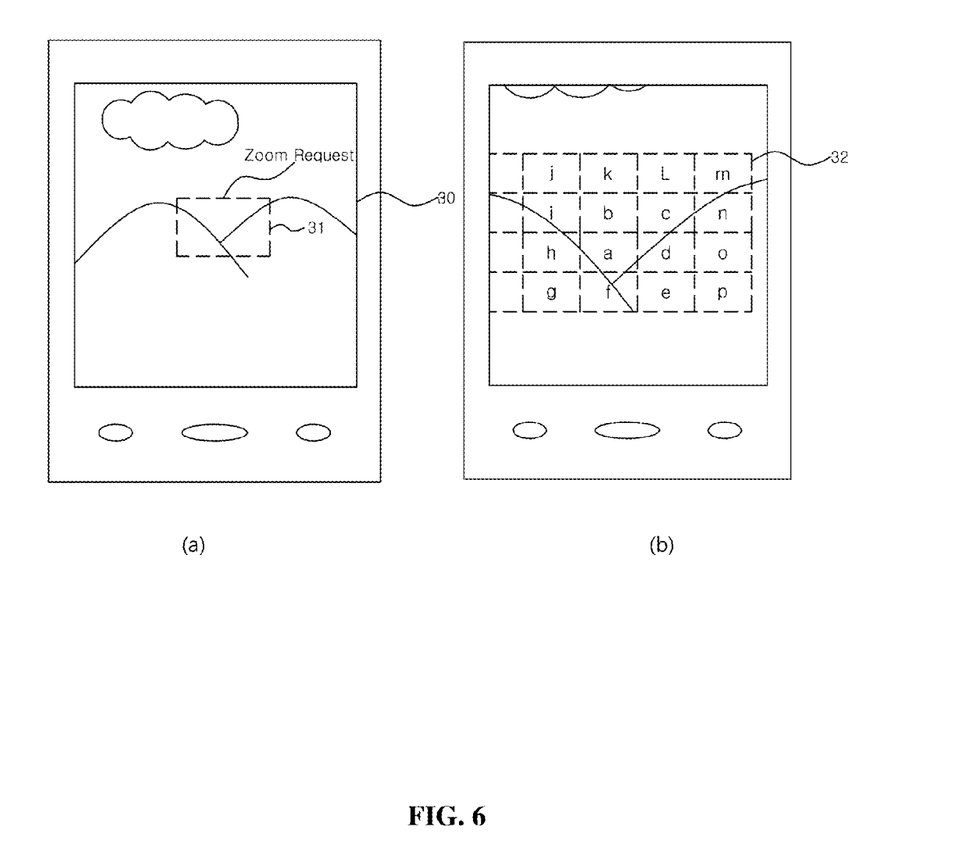
FIG. 6 illustrates a method of performing zooming in an image processing method according to an exemplary embodiment.

FIG. 6 illustrates a method of performing zooming in an image processing method according to a exemplary embodiment.

Referring to (a) of FIG. 6 and (b) of FIG. 6, in the state in which a first thumbnail 30 is displayed as in (a) of FIG. 6, a user can input a zoom request for a predetermined area, for example, 3. The zoom request may include further information, such as a zoom ratio.

Then, as shown in (b) of FIG. 6, a zoom image corresponding to the area 31 is displayed on the data processing system 1000. At this time, based on the zoom request, the image processing system specifies a zoom image, for example, 32 to be displayed after being expanded, and displays tiles included in the specified zoom image by decoding the tiles sequentially from the leftmost upper tile, for example, j. In this case, in the related art, the zoom image 32 becomes clear in the order of, for example, tiles j, k, l, m, i, b, c, n, h, a, d, o, g, f, e, and p (i.e. the relevant tiles are displayed by being decoded from the original image). In this case, as described with reference to FIG. 5A to FIG. 5C, the user may visually recognize the tiles becoming sequentially clear, feeling visual fatigue or feeling that the decoding rate is slow. This disadvantageously lowers the usability.

In contrast, according to the present embodiment, the control module 110 can select a tile (region) in the central portion of the zoom image 32 which is preferentially decoded and displayed. For example, the control module 110 may select one from among the tiles a, b, c, and d in (b) of FIG. 6 as a reference region.

In addition, decoding and displaying may be performed in the order from closest to farthest regions (tiles) from the reference region. For example, when the tile "a" is selected to be the reference region, the control module 110 decodes and displays the tile "a" first, and then decodes and displays the tiles "b, c, d, e, f, g, h, i, j, k, l, m, n, o, and p in their order. When the tiles are located at the same distances from the reference region, the orders thereof may be changed. In any case, the control module 110 can control process such that the regions become clear from the central region to the outer regions of the zoom image 32. For example, a region in the central portion of the zoom image 32 may be set as a reference region, and the regions may be sequentially decoded and displayed in the spiral direction from the reference region. However, this is not intended to be limiting.

When the regions of the zoom image 32 become clear sequentially from the center to the outer circumference, since the user notices first the central portion of the zoom image or the central portion is preferentially and naturally paid attention when the zooming is performed, even the decoding time of the entire image is equal to or similar to that of the related art, the user may feel that the decoding rate is much faster, whereby the usability can be improved. The control over the order in which the zoom image is decoded and displayed during the zooming is not limited to the case in which the first thumbnail is the image that is being displayed. It is apparent to a person skilled in the art to which the present disclosure pertains that the above-described technical principle can be applied to any image that is being displayed.

According to an exemplary embodiment of the present disclosure, the technical principle able to increase the availability of the small thumbnail is additionally provided. A small thumbnail has been generated by a predetermined ratio, i.e. a grid view ratio, generally for the purpose of grid view. The grid view ratio is the square ratio (1:1) or a ratio (e.g. 3:4) similar to the square ratio according to implementations.

That is, the small thumbnail has been generated by the predetermined grid view ratio regardless of the aspect ratio of the original image, i.e. the original ratio. However, in this case, when the small thumbnail can be more suitably displayed by the original ratio, some vacant regions may occur, which is problematic. This problem and an exemplary embodiment of the present disclosure intended to overcome this problem will be described with reference to FIG. 7.

Figure 7:
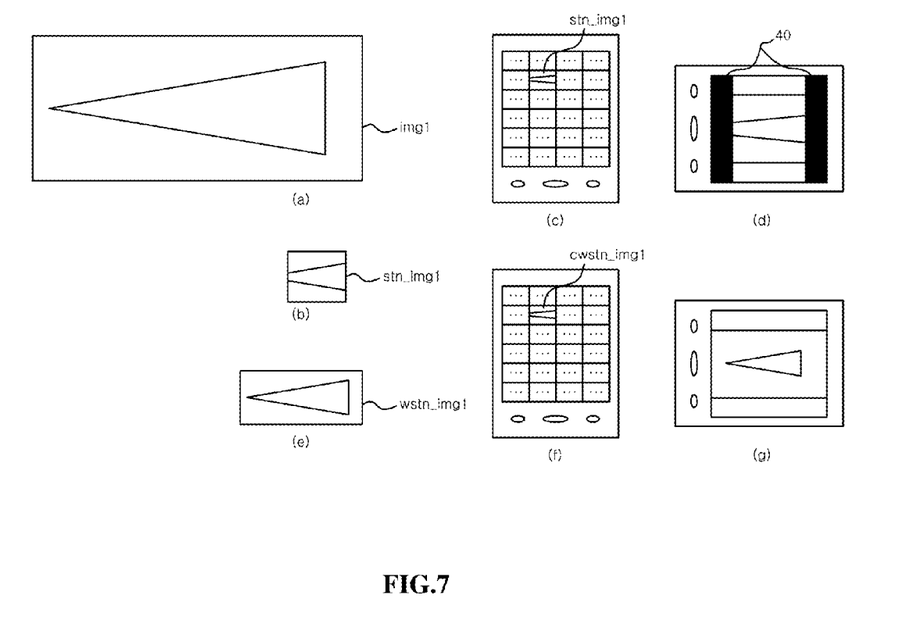
FIG. 7 illustrates wide small thumbnails according to an exemplary embodiment.

FIG. 7 illustrates wide small thumbnails (wstns) according to an exemplary embodiment.

As illustrated in (a) of FIG. 7, an original image, for example, img1, is present. In this case, the image processing system previously generates a small thumbnail, for example, stn_img1 corresponding to the grid view ratio used thereby, as illustrated in (b) of FIG. 7. Afterwards, the image processing system uses the small thumbnail stn_img1 having the grid view ratio in order to represent the list of images in the case as described with reference to FIG. 4 or as illustrated in (c) of FIG. 7. In this case, in the related art, after the original image is cropped by the grid view ratio, a small thumbnail is generated reducing the size of the original image. Consequently, the thumbnail as illustrated in (b) of FIG. 7 is generated.

However, in this case, when the small thumbnail stn_img1 needs to be displayed by the original ratio, the small thumbnail stn_img1, as illustrated in FIG. 7D, may be displayed by being scaled. However, the small thumbnail stn_img1 has a region, for example, 40 in which no image is displayed. In some implementations, the small thumbnail stn_img1 may be scaled by the size of the screen in a single direction, for example, a lateral direction or a vertical direction. In this case, the small thumbnail stn_img1 is merely the expanded image of the thumbnail illustrated in (b) of FIG. 7 and does not contain the cropped portions. Thus, as in the related art, the displayed image differs from the original image.

In order to overcome this problem, the thumbnail generating module 120 of the image processing system 100 according to the present embodiment can generate a small thumbnail, for example, a wide small thumbnail wstn_img1, having the aspect ratio of the original image, i.e. the original ratio, as illustrated in (e) of FIG. 7.

When the small thumbnail wstn_img1 having the original ratio is generated, the control module 110 can display the small thumbnail wstn_img1 corresponding to the original image by the original ratio by simply scaling the small thumbnail wstn_img1, as illustrated in (g) of FIG. 7. At this time, the small thumbnail may be scaled according to the screen in a single direction (e.g. a lateral direction). Then, the image can be displayed without being damaged even in the case in which the small thumbnail is expanded as in (d) of FIG. 7.

In addition, when the small thumbnail wstn_img1 is required to be displayed by the grid view ratio, for example, as in (f) of FIG. 7. The control module 110 can display the small thumbnail wstn_img1 by cropping the small thumbnail wstn_img1 according to the grip ratio. For example, it is possible to crop both side portions of the small thumbnail wstn_img1 by predetermined lengths, thereby generating a small thumbnail having the grid view ratio (e.g. a cropping wide small thumbnail).

Consequently, according to the present embodiment, the small thumbnail wstn_img1 can be generated according to the original ratio, such that, when the small thumbnail is displayed by being scaled, the image can be displayed without a damage in the original image. When the small thumbnail is required to be displayed by the grid view ratio, the small thumbnail wstn_img1 is used simply by being cropped. It is therefore possible to adaptively display a suitable image as required, based on the small thumbnail wstn_img1.

In addition, images can be much more efficiently displayed using the small thumbnail wstn_img1 according to the present embodiment. For example, when the small thumbnail is displayed by the grid view ratio, a real time or immediate response as in the case of listing up images is rarely requested. When the small thumbnail is displayed by being expanded or at the original ratio, a rapid and immediate response is frequently requested.

The image processing method according to the embodiments of the present disclosure may be embodied as computer readable program instructions stored in a computer readable recording medium. A control program and an object program according to embodiments of the present disclosure may be stored in the computer readable recording medium. The computer readable recording medium includes all sorts of recording devices in which data readable by a computer system are stored.

The program instructions stored in the recording medium may be program instructions specially designed and constructed for the present disclosure or program instructions known and available to a person skilled in the field of software.

Examples of the computer readable recording medium include magnetic media, such as a hard disk, a floppy disk, and a magnetic tape; optical media, such as compact disc read only memory (CD-ROM) and a digital versatile disk; magneto-optical media, such as a floptical disk; and other hardware devices specially designed to store and execute program instructions, such as read only memory (ROM), random access memory (RAM), and flash memory. In addition, the recording medium may be in the form of light or a carrier wave that conveys signals specifying program instructions, data structures, or the like, or a transmission medium, such as a metal wire or a waveguide, through which the signals are transmitted. Furthermore, the computer readable recording medium may be distributed to computer systems connected by means of networks, in which computer readable codes are stored and executed in a decentralized manner.

Examples of the program instructions include not only machine language codes generated by compilers, but also advanced language codes that may be executed by an information processing device, for example, a computer, that electronically processes information using an interpreter.

The hardware devices described above may be constructed such that they can operate as one or more software modules for performing the operations of the present disclosure, and vice versa.

While the present disclosure has been illustrated and described with reference to the certain exemplary embodiments thereof, it will be understood by those skilled in the art that various changes in form and details may be made therein without departing from the spirit and scope of the present disclosure as defined by the appended claims. Therefore, the foregoing embodiments should be understood as being illustrative but not limitative purposes. For example, some parts described as being located in a single physical entity can be implemented as being distributed to a plurality of physical devices. In the same fashion, some parts described as being distributed to a plurality of physical devices can be located in a single physical entity.

The scope of the present disclosure is defined not by the detailed description but by the appended claims, and all modifications and alterations derived from the concept, the range, and the equivalents of the claims will be construed as being included in the scope of the present disclosure.

What is claimed is:

1. An image processing method comprising:
   decoding, in an image processing system disposed on a data processing system, an original image in response to an image display request when a first thumbnail corresponding to the original image is determined to be displayed;
   displaying, in the image processing system, the first thumbnail on the data processing system by generating the first thumbnail corresponding to the original image,
   wherein decoding the original image comprises generating region information corresponding to the original image while decoding the original image, the region information indicating each location of a plurality of regions forming the original image;
   receiving, in the image processing system, a zoom request for a specific area of the displayed first thumbnail; and
   performing zooming for the specific area based on the previously-generated region information in response to the zoom request.

2. The image processing method according to claim 1, further comprising previously generating and storing, in the image processing system, a second thumbnail corresponding to the original image,
   wherein the first thumbnail is a large thumbnail or a medium thumbnail, and the second thumbnail is a small thumbnail, and
   wherein the image processing system selectively displays the second thumbnail or the first thumbnail, wherein, when the second thumbnail is selected, the image processing system displays the second thumbnail that is previously stored, and when the first thumbnail is selected, the image processing system generates the first thumbnail by decoding the original image and displays the first thumbnail.

3. The image processing method according to claim 2, further comprising generating the second thumbnail by an original ratio corresponding to the original image and storing the generated second thumbnail,
   wherein the image processing system displays the second thumbnail by cropping the second thumbnail by a grid view ratio when the image processing system need to display the second thumbnail by the grid view ratio, or displays the stored second thumbnail when the image processing system need to display the second thumbnail by the original ratio.

4. The image processing method according to claim 1, further comprising sequentially decoding, in the image processing system, a plurality of tiles to be included in the first thumbnail and storing decoded textures in a storage unit of the data processing system,
   wherein displaying, in the image processing system, the decoded original image or the first thumbnail on the data processing system comprises loading the textures stored in the storage unit to a graphic engine at a time.

5. The image processing method according to claim 4, further comprising displaying a previously-stored second thumbnail corresponding to the original image,
   wherein, when the first thumbnail is displayed after the previously-stored second thumbnail is displayed, the image processing system loads the textures of the plurality of tiles stored in the storage unit to the graphic engine at a time.

6. The image processing method according to claim 1, wherein performing the zooming based on the previously-generated region information in response to the zoom request comprises:
preferentially decoding and displaying a reference region of a zoom image to be displayed after the zooming in response to the zoom request, the zoom image containing a zoomed view of the specific area of the displayed first thumbnail; and
sequentially decoding and displaying regions of the zoom image other than the reference region in an order from closest to farthest regions from the reference region.

7. The image processing method according to claim 6, wherein the reference region is a region corresponding to a center of the zoom image.

8. A computer program recorded in a non-transitory computer-readable recording medium, the program being installed in a data processing system to execute the method of claim 1.

9. An image processing system comprising:
a thumbnail generating module configured to generate a first thumbnail corresponding to an original image based on the original image in response to an image display request;
a decoding module configured to decode the original image for generating the first thumbnail; and
a control module configured to display the first thumbnail on a data processing system on which the image processing system is disposed,
wherein the decoding module is configured to generate region information corresponding to the original image while generating the first thumbnail, the region information indicating each location of a plurality of regions forming the original image,
wherein the image processing system further comprising an interface module is configured to receive a zoom request for a specific area of the first thumbnail that is displayed,
wherein the control module is further configured to perform zooming for the specific area based on the previously generated region information in response to the zoom request.

10. The image processing system according to claim 9, wherein the thumbnail generating module is configured to store a second thumbnail corresponding to the original image,
wherein the first thumbnail is a large thumbnail, and the second thumbnail is a small thumbnail or a medium thumbnail, and
wherein the control module is further configured to display the second thumbnail that is previously stored or display the first thumbnail generated after the original image is decoded.

11. The image processing system according to claim 9, wherein the decoding module is configured to sequentially decode a plurality of tiles to be included in the first thumbnail and stores decoded textures in a storage unit of the data processing system, and
wherein the control module is configured to load the textures stored in the storage unit to a graphic engine at a time.

* * * * *